United States Patent
Gishi

(10) Patent No.: US 7,165,848 B2
(45) Date of Patent: Jan. 23, 2007

(54) PROJECTION TYPE VIDEO DISPLAY

(75) Inventor: Hiromitsu Gishi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 220 days.

(21) Appl. No.: 10/901,963

(22) Filed: Jul. 30, 2004

(65) Prior Publication Data
US 2005/0030492 A1 Feb. 10, 2005

(30) Foreign Application Priority Data
Aug. 4, 2003 (JP) .............................. 2003-285942

(51) Int. Cl.
- G03B 21/14 (2006.01)
- G03B 21/22 (2006.01)
- G03B 3/00 (2006.01)
- G03B 9/08 (2006.01)
- G03B 17/02 (2006.01)

(52) U.S. Cl. .................. 353/88; 353/97; 353/101; 353/119; 352/204; 352/242

(58) Field of Classification Search .............. 353/97, 353/101, 119, 88; 349/5–10; 348/744; 352/204, 352/242, 218, 220
See application file for complete search history.

(56) References Cited

U.S. PATENT DOCUMENTS

| | | | |
|---|---|---|---|
| 4,231,067 A * | 10/1980 | Jewell et al. ............... | 348/785 |
| 4,756,615 A * | 7/1988 | Hildebrand ................. | 353/74 |
| 5,278,596 A * | 1/1994 | Machtig ..................... | 353/122 |
| 5,379,081 A * | 1/1995 | Kim et al. .................. | 353/99 |
| 6,966,657 B1 * | 11/2005 | Van De Velde et al. .... | 353/101 |

FOREIGN PATENT DOCUMENTS

JP 9-138377 5/1997

* cited by examiner

*Primary Examiner*—Melissa Jan Koval
(74) *Attorney, Agent, or Firm*—Westerman, Hattori, Daniels & Adrian, LLP.

(57) ABSTRACT

A doughnut-shaped dust-proof plate is externally fitted in the body of the projection lens. The dust-proof plate comprises a first member which is flexible like rubber and a second member made of plastic which is uneasy to deform. The second member is made lower in a vertical direction (lengthwise) than the first member, thereby making it possible to allow deformation at an upper end and a lower end of the first member. On the other hand, the second member is made long in a horizontal direction (crosswise). A longitudinal portion of the second member is set to have such a length that it can come into contact with an upper or lower wall of the frame of the liquid crystal projector even if the projection lens is positioned at the lowermost or uppermost position, respectively.

16 Claims, 8 Drawing Sheets

PROJECTION TYPE VIDEO DISPLAY

BACKGROUND OF THE INVENTION

Field of the Invention

The present invention relates to a projection type video display comprising a lens shift mechanism.

Examples of a projection type video display include a liquid crystal projector. A known liquid crystal projector comprises a lens shift mechanism for moving a projected video up and down with its main body kept immovable and preventing the projected video from having a trapezoidal shape (JP-A-09-138377).

SUMMARY OF THE INVENTION

In a lens shift mechanism, a relatively large lens shift width can be ensured in a vertical direction (lengthwise) or a horizontal direction (crosswise). For this purpose, a large clearance must be ensured between a projection lens and an aperture of a front cover in a liquid crystal projector in correspondence with the lens shift width. However, the large clearance between the projection lens and the aperture of the front cover not only loses design but also allows dust to easily enter a frame of the projector.

In view of the foregoing circumstances, an object of the present invention is to provide a projection type video display capable of further preventing dust from entering its frame even when a large clearance is ensured between the projection lens and an aperture of a front cover.

In order to solve the above-mentioned problem, in a projection type video display comprising a lens shift mechanism for shifting a projection lens projecting outward from an aperture of a front cover in a direction perpendicular to its optical axis, a projection type video display according to the present invention is characterized in that a plate member which is deformable in a vertical direction (lengthwise) or a horizontal direction (crosswise) is disposed to close a clearance between the aperture and the projection lens on a reverse surface of the front cover.

In the above-mentioned configuration, the plate member is provided to close the clearance between the aperture and the projection lens on the reverse surface of the front cover. Even when a large clearance is ensured between the projection lens and the aperture, therefore, dust can be prevented from entering a frame of the projection type video display.

The plate member may be constructed by affixing a first member having flexibility and a second member which is uneasy to deform. Consequently, the durability can be significantly improved, as compared with that in a case where the plate member is composed of only the first member having flexibility.

The plate member may have a shape of accordion pleats, and horizontal lines in the accordion pleats may be formed in a direction perpendicular to the direction of deformation.

In the projection type video display having such a configuration, the plate member may be externally fitted in the body of the projection lens, and the plate member may be connected to a movable member on which the projection lens is mounted in the lens shift mechanism. In such a configuration, the plate member can be prevented from being undesirably turned and moved.

Alternatively, in the projection type video display having such a configuration, the plate member may be externally fitted in the body of the projection lens, and there may be further provided a restraining member for restraining the movement of the plate member by touching the plate member. In such a configuration, the plate member is simply externally fitted in the body of the projection lens. As a result, the assembling work is significantly easy.

In such a configuration, the projection type video display may be so configured that the second member in the plate member is made lower in a vertical direction (lengthwise) or narrower in a horizontal direction (crosswise) than the first member, while being stopped after being turned at an angle of less than 90 degrees by contacting a portion which is not made low or made narrow of the second member with its frame even if the plate member is undesirably turned on the body of the projection lens.

The foregoing and other objects, features, aspects and advantages of the present invention will become more apparent from the following detailed description of the present invention when taken in conjunction with the accompanying drawings

DESCRIPTION OF THE PREFERRED EMBODIMENTS

Figure 1:
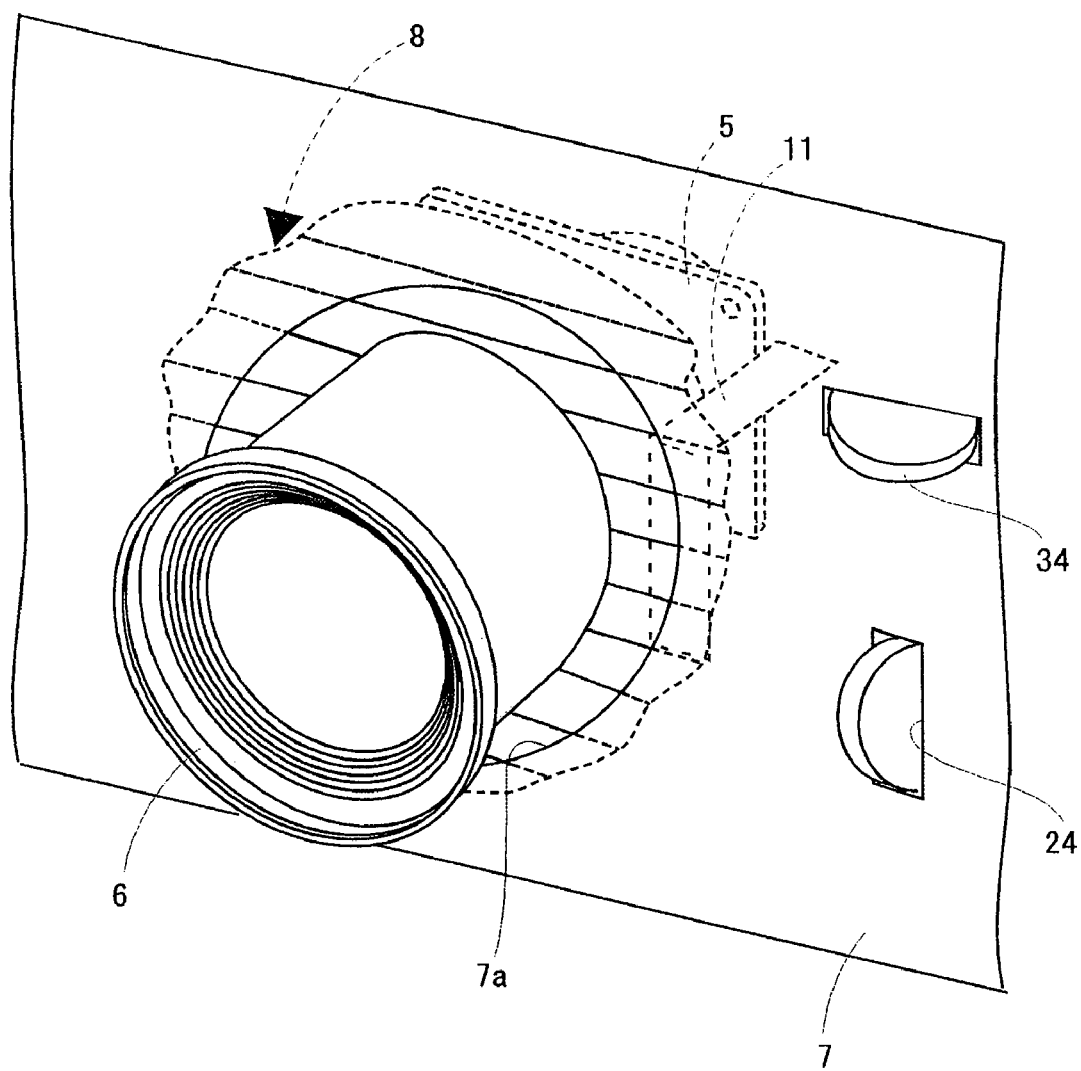
FIG. 1 is a perspective view showing a dust-proof structure in a liquid crystal projector according to the present invention.

A projection type video display according to an embodiment of the present invention will be described on the basis of FIGS. 1 to 8. First, an optical system for a liquid crystal projector is illustrated. FIG. 8 is a diagram illustrating an optical system for a three-panel color liquid crystal projector. A light emitter in a light source 101 is composed of a ultra-high pressure mercury lamp, a metal halide lamp, a xenon lamp, or the like, and its irradiated light is emitted after being changed into parallel lights by a parabolic reflector, and is introduced into an integrator lens 102

The integrator lens 102 is composed of pairs of groups of lenses, and each of the pairs of lenses introduces the light emitted from the light source 101 into the whole surface of liquid crystal light valves 111, 112, and 113. The light which has passed through the integrator lens 102 is introduced into a first dichroic mirror 103.

The first dichroic mirror 103 transmits light in a red wavelength band and reflects light in a cyan (green+blue) wavelength band. The light in the red wavelength band which has passed through the first dichroic mirror 103 is reflected on a total reflecting mirror 104 so that its optical path is changed. The red light reflected on the total reflecting mirror 104 is optically modulated by passing through the transmission type liquid crystal light valve for red light 111 through a condenser lens 108. On the other hand, the light in the cyan wavelength band which has been reflected on the first dichroic mirror 103 is introduced into a second dichroic mirror 105.

The second dichroic mirror 105 transmits light in a blue wavelength band and reflects light in a green wavelength band. The light in the green wavelength band which has been reflected on the second dichroic mirror 105 is introduced into the transmission type liquid crystal light valve for green light 112 through a condenser lens 109, and is optically modulated by passing through the liquid crystal light valve 112. The light in the blue wavelength band which has passed through the second dichroic mirror 105 is introduced into the transmission type liquid crystal light valve for blue light 113 through total reflection mirrors 106 and 107 and a condenser lens 110, and is optically modulated by passing through the liquid crystal light valve 113.

Each of the liquid crystal light valves 111, 112, and 113 comprises an incidence-side light polarizing plate, a panel constructed by sealing a liquid crystal between a pair of glass boards (having a pixel electrode and an orientation film formed therein), and an emission-side light polarizing plate. Modulated lights (video lights in respective colors) modulated by respectively passing through the liquid crystal light valves 111, 112, and 113 are mixed by a dichroic prism 114, to be a color video light. The color video light is enlarged and projected by a projection lens unit 115, and is projected and displayed on a screen.

A lens shift mechanism and a dust-proof structure will be then mainly described.

[Fixed Base 1]

As shown in FIGS. 3, 4A, 4B, and 7, a vertical driving mechanism 2 and a horizontal driving mechanism 3 are provided on a fixed base 1. The fixed base 1 is fixed to a front surface of a main body chassis (not shown), so that a dial 24 in the vertical driving mechanism 2 and a dial 34 in the horizontal driving mechanism 3 are exposed from a hole of a front cover 7 (see FIGS. 1 and 7) in the liquid crystal projector. Further, a projection lens 6 (see FIGS. 1 and 7) is attached to a vertical movable base 5. The projection lens 6 projects from a circular hole 7a of the front cover 7. Horizontal slots 1a are formed at two positions on the upper side and one position on the lower side of the fixed base 1. The length of the horizontal slot 1a corresponds to a moving range of a horizontal movable base 4, described later. Further, an aperture 1b for projected video light passage is formed in the fixed base 1. The aperture 1b is formed not in the shape of a square respectively having right angles at its four corners but in the shape of an octagon having four corners 1c inclined at an angle of 45 degrees.

[Vertical Driving Mechanism 2]

A driving mechanism chassis 21 is provided with a rotating member 22 which rotates around a horizontal axis. The dial 24 is fitted in the rotating member 22. When the dial 24 is turned in a state where the rotating member 22 is rotatable, the rotating member 22 is rotated by a frictional force. Even if the dial 24 is turned in a state where the rotating member 22 is unrotatable, however, the rotating member 22 is not rotated, and the dial 24 is only slipped and rotated. A bevel gear 22a is fixed to a right end in the drawing of the rotating member 22, and the bevel gear 22a is meshed with a bevel gear 23a. The bevel gear 23a is formed at a forward end of a first driving force transmitting member 23. The first driving force transmitting member 23 has its axis set in a forward and backward direction and is provided so as to be rotatable around the axis. A worm 23b is formed at a backward end of the first driving force transmitting member 23. The worm 23b is meshed with a worm gear 25a formed at a right end in the drawing of a second driving force transmitting member 25. The second driving force transmitting member 25 has its axis set in a horizontal direction (crosswise), and a gear 25b is formed at a left end in the drawing of the second driving force transmitting member 25. The gear 25b has a large width corresponding to a horizontal moving range of the vertical movable base 5 (that is, a horizontal moving range of the horizontal movable base 4).

[Horizontal Driving Mechanism 3]

Figure 3:
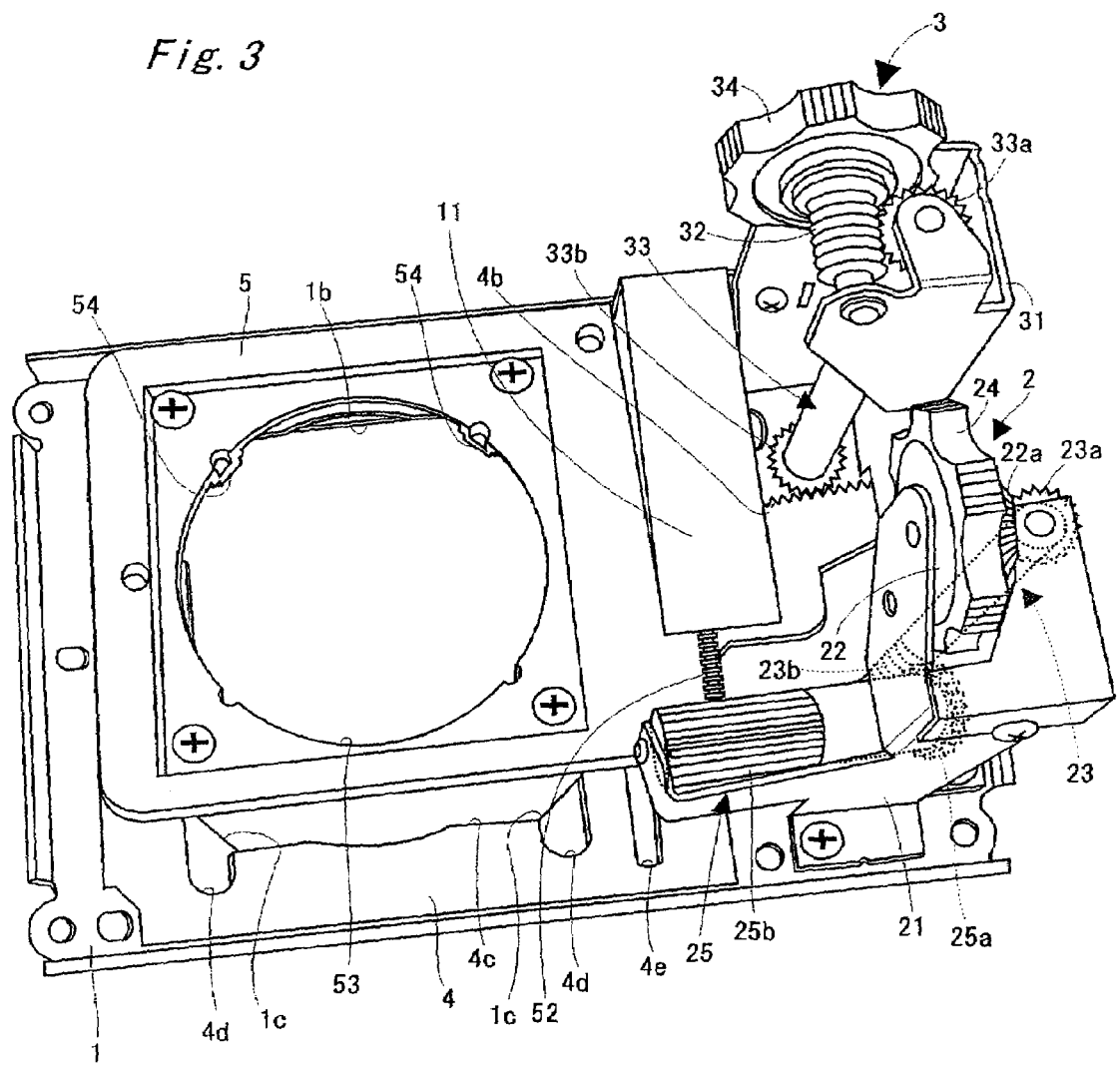
FIG. 3 is a perspective view showing a lens shift mechanism.

A driving mechanism chassis 31 is provided with a rotating member which rotates around a vertical axis (which is not illustrated because it is concealed in FIG. 3). The dial 34 is fitted in the rotating member. When the dial 34 is turned in a state where the rotating member is rotatable, the rotating member is rotated by a frictional force. Even if the dial 34 is turned in a state where the rotating member is unrotatable, however, the rotating member is not rotated, and the dial 34 is only slipped and rotated. A worm 32 is formed at a lower end of the rotating member, and the worm 32 is meshed with a warm gear 33a. The worm gear 33a is formed at a forward end of a driving force transmitting member 33. The driving force transmitting member 33 has its axis set in a forward and backward direction and is provided so as to be rotatable around the axis. A gear 33b is formed at a backward end of the driving force transmitting member 33.

[Horizontal Movable Base 4]

Figure 4A:
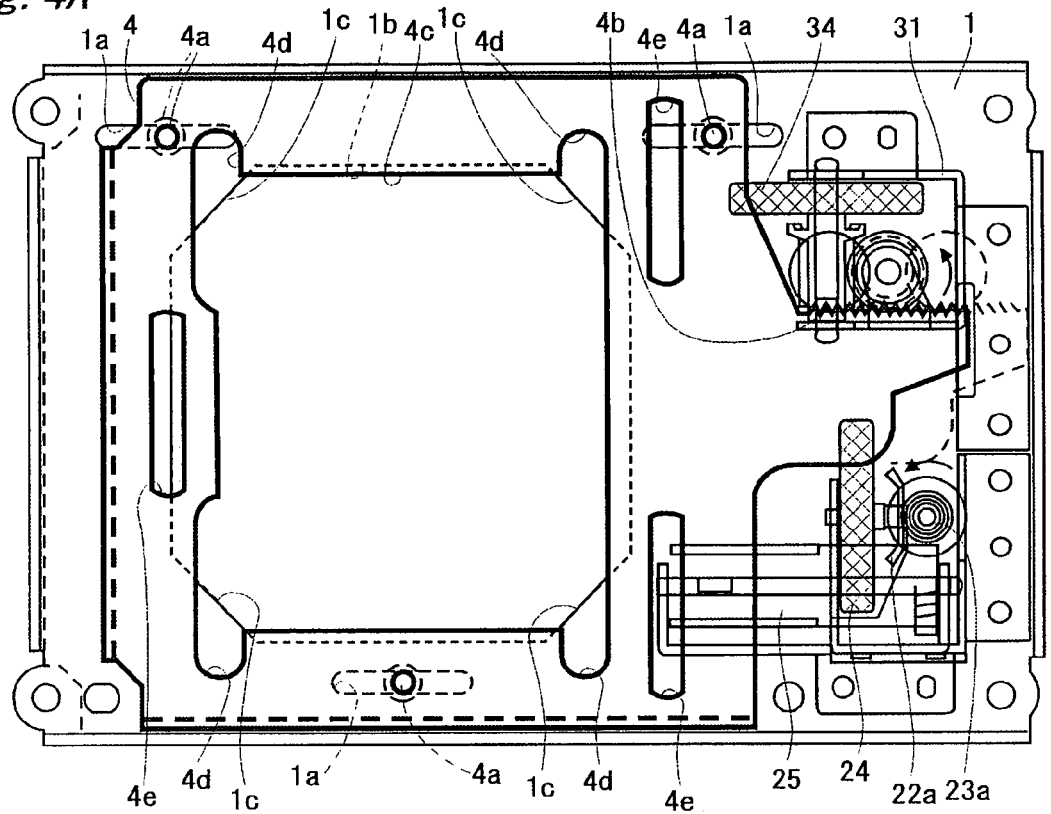
FIG. 4A is a plan view showing a state where a vertical movable base in the lens shift mechanism is omitted.
Figure 4B:
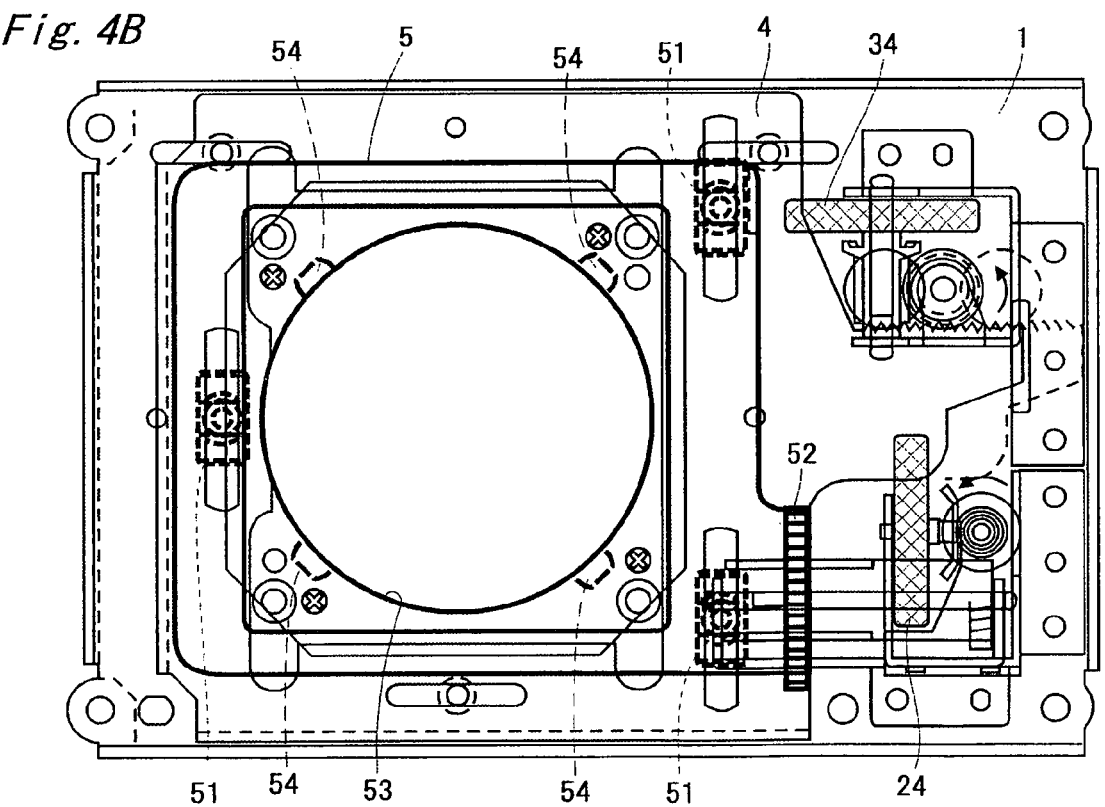
FIG. 4B is a plan view showing a state where a vertical movable base in the lens shift mechanism is not omitted.
Figure 7:
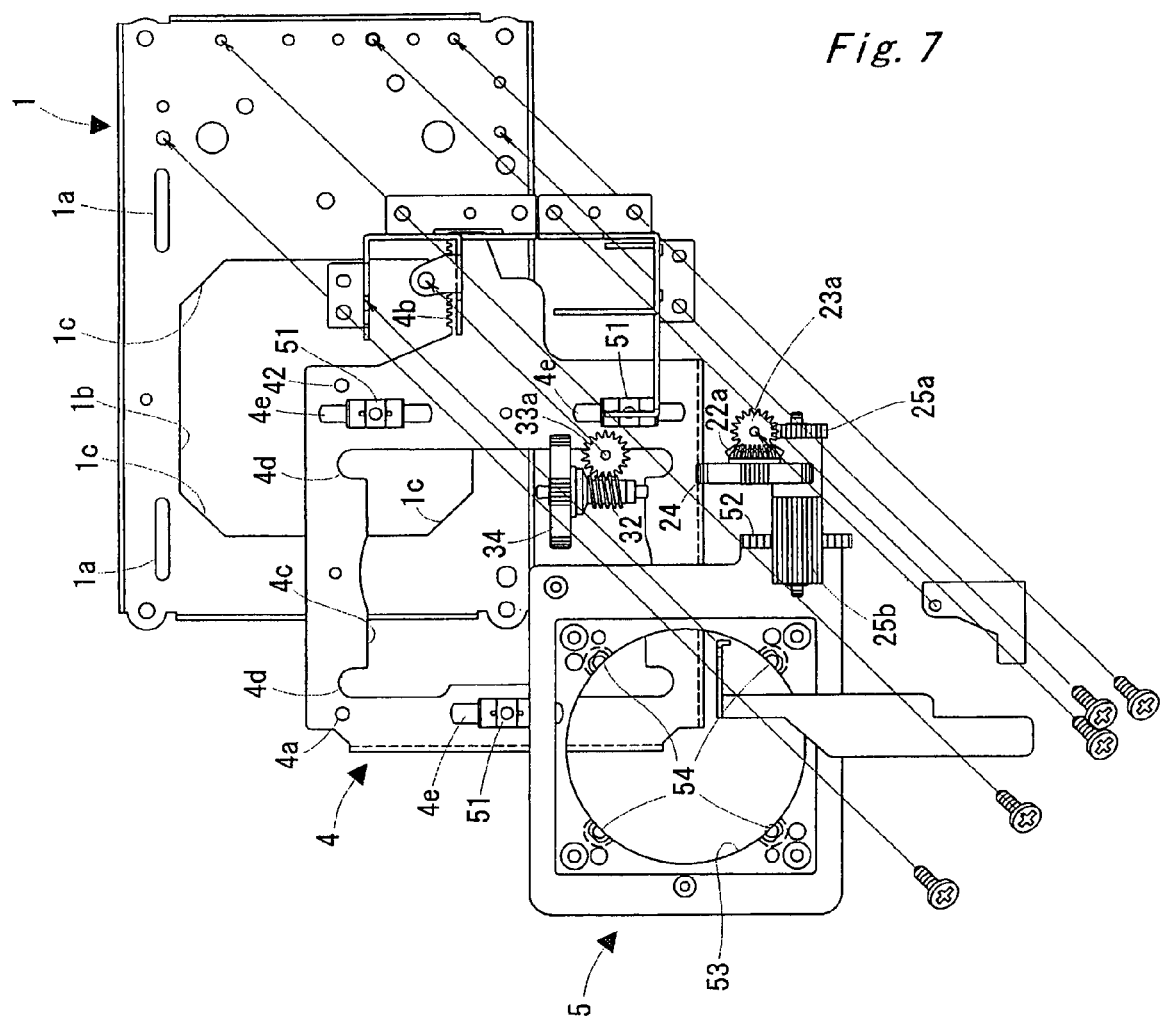
FIG. 7 is an exploded perspective view showing the lens shift mechanism.
Figure 8:
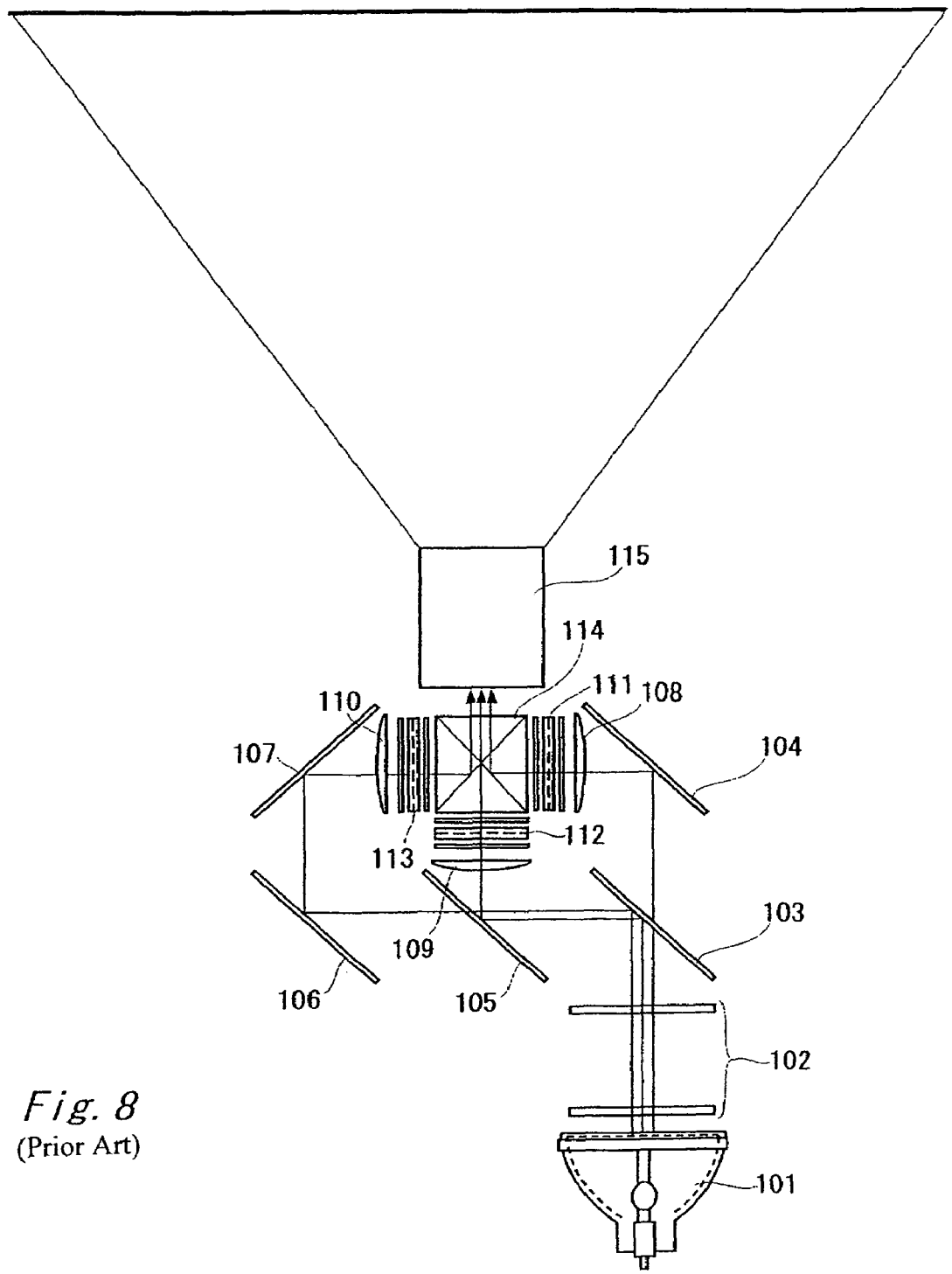
FIG. 8 is an explanatory view showing a general optical system for a liquid crystal projector.

The horizontal movable base 4 is indicated by a thick solid line in FIG. 4A (also see FIG. 7). Projections 4a are respectively formed at two positions on the upper side and one position on the lower side of a reverse surface (a backward side surface) of the horizontal movable base 4 in correspondence with positions, where the three horizontal slots 1a are formed, in the fixed base 1. The projections 4a project from a reverse surface of the fixed base 1 after respectively passing through the horizontal slots 1a. A washer having a larger diameter than the width of the horizontal slot 1a is externally fitted in the projection 4a, and a coil spring is compressed and externally fitted on the projection 4a and the coil spring is subjected to holding processing. Consequently, the horizontal movable base 4 is horizontally moved because the projection 4a is guided by the horizontal slot 1a while being pressed against the fixed base 1 upon being pressed by the coil spring. A horizontal gear 4b is formed at a right end in the drawing of the horizontal movable base 4. A gear 33b in the driving force transmitting member 33 is meshed with the horizontal gear 4b, and the horizontal movable base 4 is horizontally moved by receiving a rotating force of the gear 33b. An aperture 4c for projected video light passage is formed at the center of the horizontal movable base 4, and inlets 4d communicating with the aperture 4c are formed at four corners of the aperture for passage 4c. The inlet 4d is formed so as to avoid interference with a boss (in which a mounting screw hole of the projection lens 6 is formed) formed in the vertical movable base 5. Further, vertical slots 4e are formed at two positions on the right side of the aperture for passage 4c in the horizontal movable base 4, and a vertical slot 4e is formed at one position on the left side thereof.

[Vertical Movable Base 5]

The vertical movable base 5 is carried on the horizontal movable base 4. A boss having a screw hole is formed in correspondence with the position where the vertical slot 4e is formed on a reverse surface of the vertical movable base 5. A leaf spring member 51 having a larger width than that of the vertical slot 4e is arranged on a reverse surface of the horizontal movable base 4, and the leaf spring member 51 is attached to the boss by a screw. Consequently, the vertical movable base 5 is moved in a vertical direction (lengthwise) because the boss is guided by the vertical slot 4e while being pressed against the horizontal movable base 4 upon being pressed by the leaf spring member 51. A rack 52 with which the gear 25b in the second driving force transmitting member 25 is meshed is formed in the vertical direction (lengthwise) at a position on the lower right side of the vertical movable base 5. The vertical movable base 5 is driven in the vertical direction (lengthwise) by receiving a driving force of the gear 25b in the rack 52. Further, a circular aperture 53 for projected video light passage is formed at the center of the vertical movable base 5. Four movement restraining convex areas 54 are formed on the reverse surface of the vertical movable base 5. The movement restraining convex areas 54 are formed on orthogonal lines connecting the respective centers of the corners 1c inclined at an angle of 45 degrees in the fixed base 1 and in the vicinity of the circular aperture 53 in a state where both the vertical movable base 5 and the horizontal movable base 4 are positioned at the center (a state where the projection lens is positioned at the center). The length of projection of the movement restraining convex area 54 is set to such a degree that the movement restraining convex area 54 is somewhat beyond the reverse surface of the fixed base 1.

When the dial 24 is rotated by applying a force with fingers in an upward direction from the bottom in a state where both the vertical movable base 5 and the horizontal movable base 4 are positioned at the center (the projection lens is positioned at the center), the vertical movable base 5 is driven so that the projection lens is moved upward. Similarly, when the dial 24 is rotated by applying a force with fingers in a downward direction from the top, the vertical movable base 5 is driven so that the projection lens is moved downward. When the dial 34 is rotated by applying a force in a rightward direction from the left in a state where both the vertical movable base 5 and the horizontal movable base 4 are positioned at the center (the projection lens is positioned at the center), the horizontal movable base 4 is driven so that the projection lens is moved rightward. Similarly, when the dial 34 is rotated by applying a force with fingers in a leftward direction from the right, the horizontal movable base 4 is driven so that the projection lens is moved leftward.

[Dust-Proof Structure]

Figure 2A:
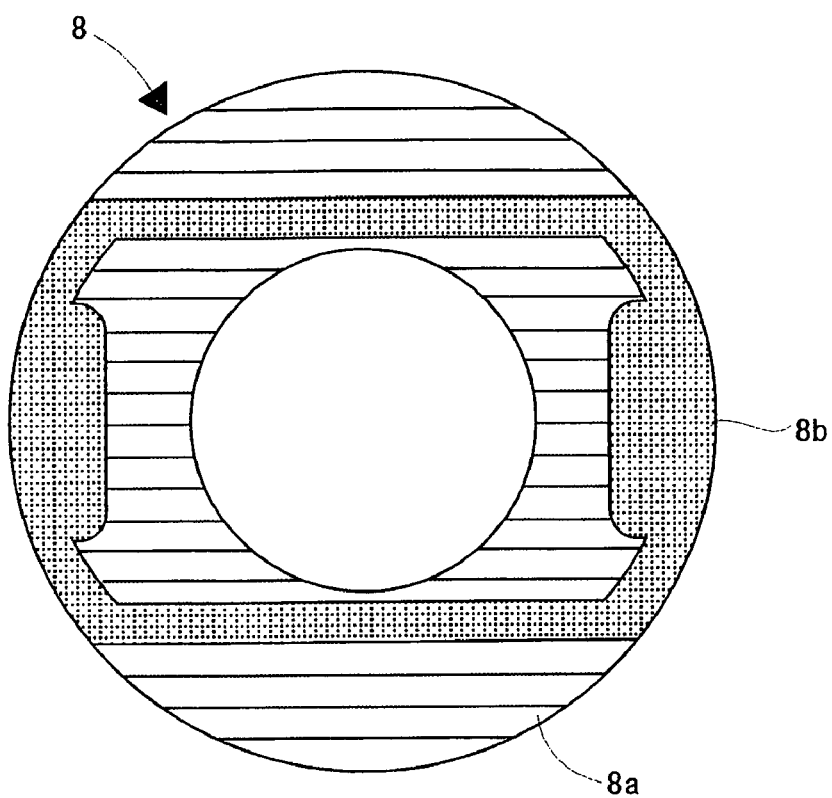
FIG. 2A is a plan view showing a dust-proof plate in the dust-proof structure.
Figure 2B:
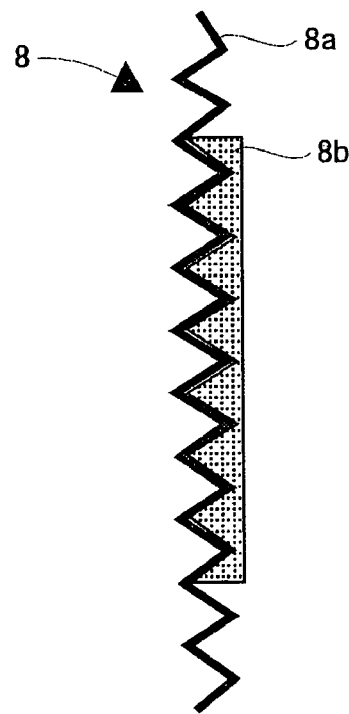
FIG. 2B is a side view showing the dust-proof plate in the dust-proof structure.

As shown in FIG. 1, a doughnut-shaped dust-proof plate 8 is externally fitted in the body of the projection lens 6. The dust-proof plate 8 is constructed by affixing a second member 8b made of plastic which is uneasy to deform to a reverse surface of a first member 8a which is flexible like rubber, as shown in FIGS. 2A and 2B. The second member 8b is made lower in a vertical direction (lengthwise) than the first member 8a, thereby making it possible to allow deformation at an upper end and a lower end of the first member 8a. On the other hand, the second member 8b is made long in a horizontal direction (crosswise). A longitudinal portion of the second member 8b is set to have such a length that it can come into contact with a lower wall of the frame of the liquid crystal projector even if the projection lens 6 is positioned at the uppermost position and can come into contact with an upper wall of the frame even if the projection lens 6 is positioned at the lowermost position in a state where the dust-proof plate 8 is obliquely turned. The first member 8a has a shape of accordion pleats having ridge and valley portions alternately formed therein, and the second member 8b also has ridge and valley portions alternately formed on its one surface such that it can easily support the first member 8a in the shape of accordion pleats. Fold lines in the shape of accordion pleats are formed in a direction perpendicular to the vertical direction (lengthwise) which is the direction of deformation. A surface of the first member 8a is subjected to frosting processing.

Figure 5:
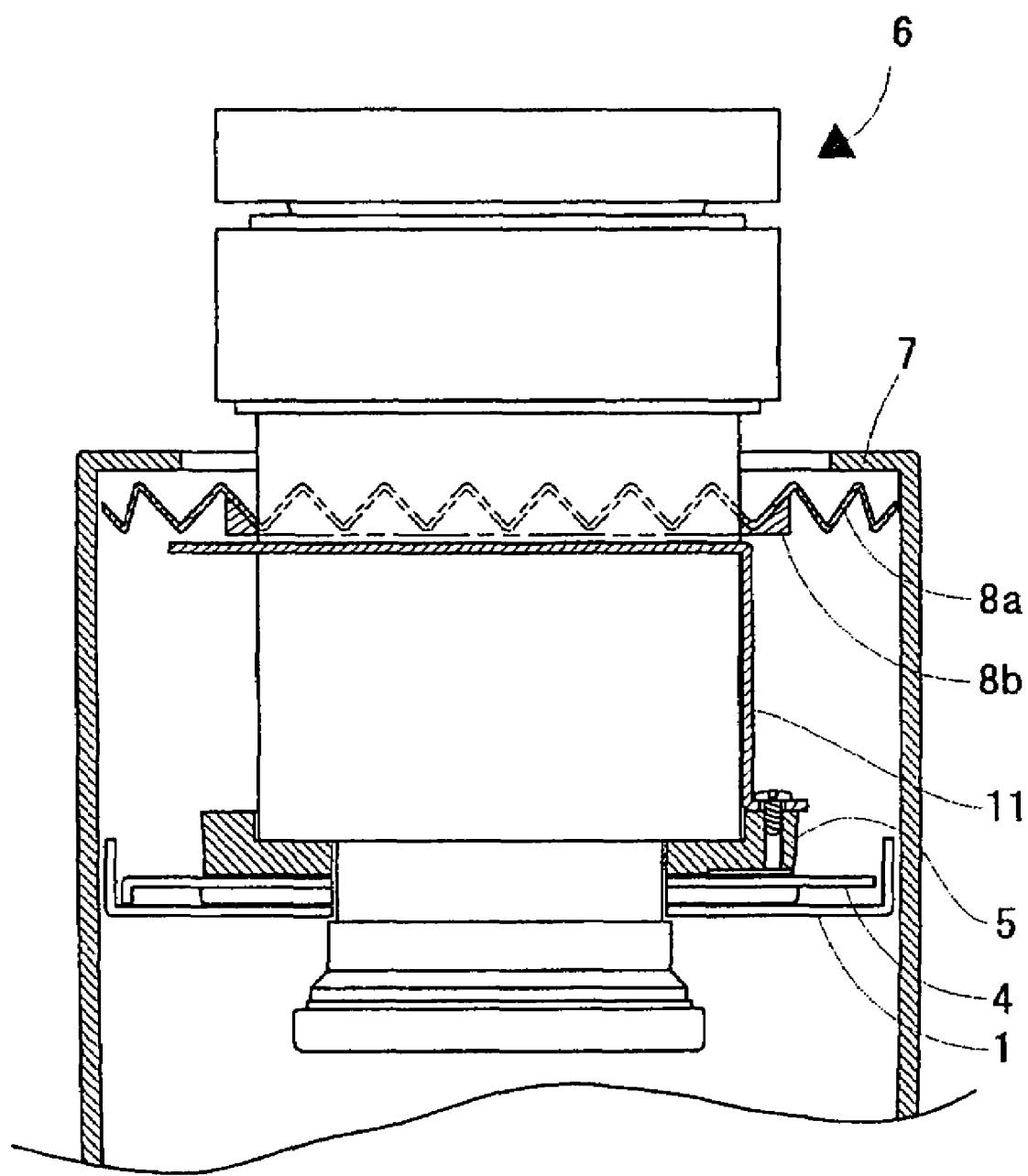
FIG. 5 is a cross-sectional view showing the dust-proof structure (utilizing a restraining member 11)

The dust-proof plate 8 is positioned on a reverse surface of the front cover 7. However, a restraining member 11 for restraining the movement of the dust-proof plate 8 in the depth-wise direction is further provided, as also shown in FIG. 5, on a reverse surface of the dust-proof plate 8. A clearance between a restraining surface in the restraining member 11 and the front cover 7 is made slightly larger than the thickness of the dust-proof plate 8. The restraining member 11 is screwed into a side wall of the driving mechanism chassis 31, described above. Alternatively, the restraining member 11 may be screwed into the vertical movable base 5, as shown in FIG. 5.

As described in the foregoing, according to the liquid crystal projector, the projection lens 6 is provided with the dust-proof plate 8, thereby making it possible to prevent dust from entering the frame of the liquid crystal projector even when a large clearance is ensured between the projection lens 6 and the aperture 7a of the front cover 7. The dust-proof plate 8 is simply externally fitted in the body of the projection lens 6. As a result, the assembling work is significantly easy. Although the liquid crystal projector herein illustrated is of a transverse-mounted type and the height is low. However, the second member 8b in the dust-proof plate 8 is designed lower in the vertical direction (lengthwise) than the first member 8a, to allow the deformation at the upper end and the lower end of the first member 8a, which does not interfere with upward and downward shifting of the projection lens 6. When the dust-proof plate 8 is simply externally fitted in the body of the projection lens 6, the dust-proof plate 8 is turned so that the direction of fold lines in the accordion pleats can be changed by 90 degrees. However, the second member 8b is designed long in the horizontal direction (crosswise), and the longitudinal portion is set to have such a length that it can come into contact with the lower wall of the frame even if the projection lens 6 is positioned at the uppermost position and can come into contact with the upper wall of the frame even if the projection lens 6 is positioned at the lowermost position in a state where the dust-proof plate 8 is obliquely turned. Therefore, the dust-proof plate 8 is prevented from being turned at an angle of 90 degrees. Further, the restraining member 11 for restraining the movement in the depth-wise direction of the dust-proof plate 8 is provided. Even if the projection lens 6 can be somewhat moved in the direction of its optical axis, therefore, the dust-proof plate 8 is not moved in the depth-wise direction by following the movement of the projection lens 6, thereby making it possible to prevent a large clearance from being formed between the dust-proof plate 8 and the front cover 7. In the present embodiment, the movement restraining convex area 54 comes into contact with the inclined corner 1c so that the moving range in the oblique direction of the projection lens 6 is limited, thereby making it possible to form the dust-proof plate 8 in the shape of a circle of a suitable size without being uselessly made larger by the limitation of the moving range. Of course, the shape of the dust-proof plate 8 is not limited to a circular shape.

Figure 6:
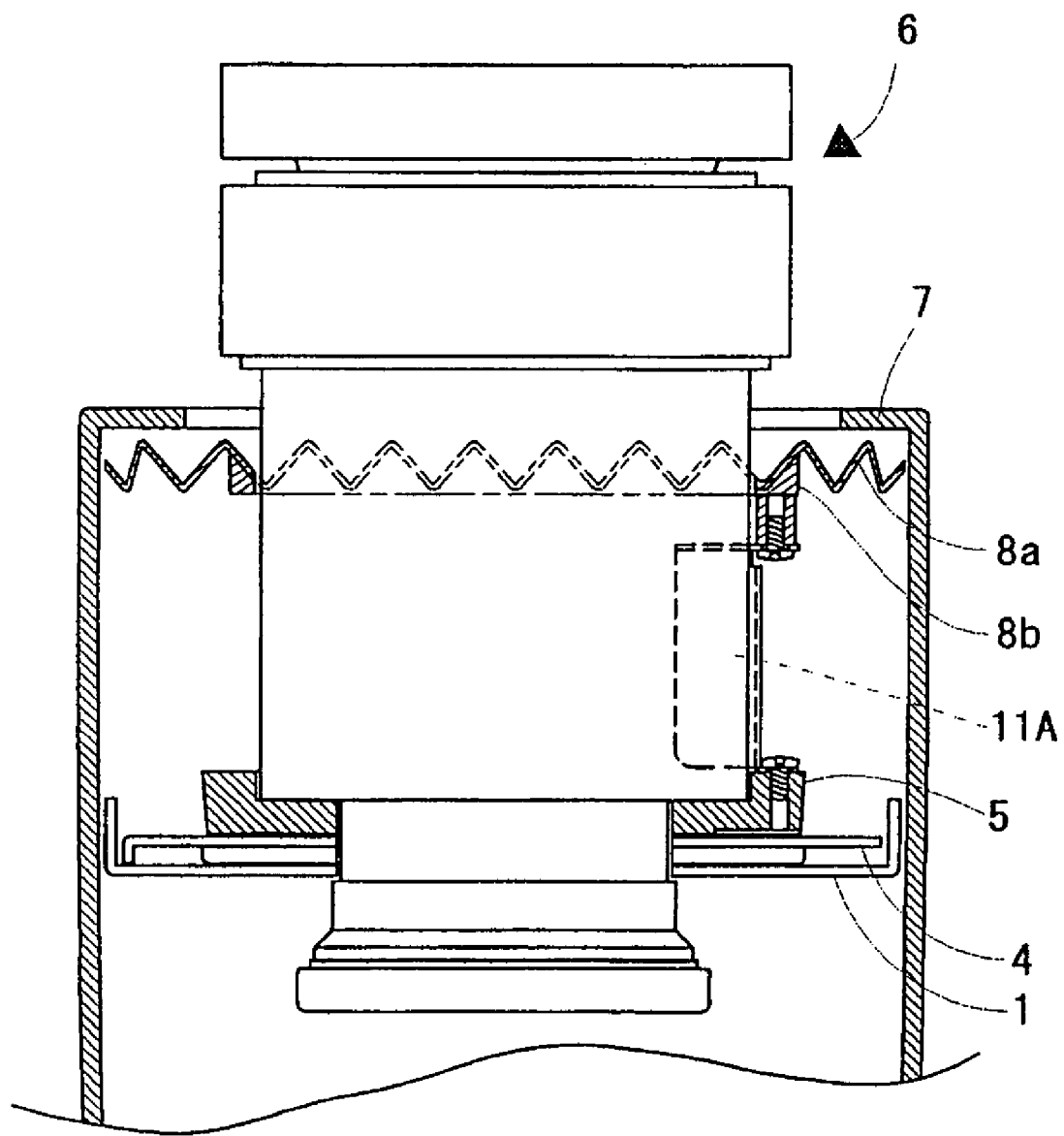
FIG. 6 is a cross-sectional view showing another example of a dust-proof structure (utilizing a metal fitting 11A)

FIG. 6 is a diagram showing an example of a configuration in which the restraining member 11 is replaced with a metal fitting 11A. The metal fitting 11A has its one end screwed into the vertical movable base 5 and has the other end screwed into the second member 8b. That is, the dust-proof plate 8 is fixed to the vertical movable base 5 through the metal fitting 11A. In the case of such a configuration, the dust-proof plate 8 can be prevented from being moved by following the movement of the projection lens 6. Although a slight clearance exists between the projection lens 6 and the dust-proof plate 8, the entrance of dust can be prevented as much as possible. Further, even if the projection lens 6 is rotated for the purpose of focusing adjustment, the dust-proof plate 8 does not interfere with the rotation. If the metal fitting 11A is provided, the restraining member 11 can be omitted.

The configuration of the projection type video display is not limited to one having a video producing optical system using three transmission type liquid crystal display panels. It may be a configuration comprising another video producing optical system. The above-mentioned lens shift mechanism is arranged by being turned at an angle of 90 degrees, thereby making it possible to horizontally move the vertical movable base and vertically move the horizontal movable base 4.

As described in the foregoing, according to the present invention, even when a large clearance is ensured between the projection lens and the aperture of the front cover, dust can be prevented from entering the frame of the liquid crystal projector.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection type video display comprising a lens shift mechanism for shifting a projection lens in a direction perpendicular to its optical axis, said projection lens extending outward from an aperture of a front cover,
   a projection type video display wherein
   a plate member which is deformable in a vertical direction perpendicular to said optical axis (lengthwise) or in a horizontal direction perpendicular to said optical axis (crosswise) is disposed to close a clearance between the aperture and the projection lens on a reverse surface of the front cover.

2. The projection type video display according to claim 1, wherein
   the plate member is constructed by affixing a first member having flexibility and a substantially rigid second member.

3. The projection type video display according to claim 1, wherein
   the plate member has a shape of accordion pleats, and
   horizontal lines in the accordion pleats are formed in a direction perpendicular to the direction of deformation.

4. The projection type video display according to claim 2, wherein the plate member has a shape of accordion pleats, and
   horizontal lines in the accordion pleats are formed in a direction perpendicular to the direction of deformation.

5. The projection type video display according to claim 1, wherein
   the plate member is externally fitted in the body of the projection lens, and
   the plate member is connected to a movable member on which the projection lens is mounted in the lens shift mechanism.

6. The projection type video display according to claim 2, wherein
   the plate member is externally fitted in the body of the projection lens, and
   the plate member is connected to a movable member on which the projection lens is mounted in the lens shift mechanism.

7. The projection type video display according to claim 3, wherein the plate member is externally fitted in the body of the projection lens, and the plate member is connected to a movable member on which the projection lens is mounted in the lens shift mechanism.

8. The projection type video display according to claim 4, wherein the plate member is externally fitted in the body of the projection lens, and the plate member is connected to a movable member on which the projection lens is mounted in the lens shift mechanism.

9. The projection type video display according to claim 1, wherein
   the plate member is externally fitted in the body of the projection lens, and
   there is further provided a restraining member for restraining the movement of the plate member by touching the plate member.

10. The projection type video display according to claim 2, wherein
    the plate member is externally fitted in the body of the projection lens, and
    there is further provided a restraining member for restraining the movement of the plate member by touching the plate member.

11. The projection type video display according to claim 3, wherein
    the plate member is externally fitted in the body of the projection lens, and
    there is further provided a restraining member for restraining the movement of the plate member by touching the plate member.

12. The projection type video display according to claim 4, wherein
    the plate member is externally fitted in the body of the projection lens, and
    there is further provided a restraining member for restraining the movement of the plate member by touching the plate member.

13. The projection type video display according to claim 9, wherein the second member in the plate member has a smaller length in a vertical direction (lengthwise) or narrower in a horizontal direction (crosswise) than the first member, while being stopped after being rotated at an angle of less than 90 degrees by contacting a portion which is not smaller in length or made narrow in the second member with its frame even if the plate member is undesirably rotated on the body of the projection lens.

14. The projection type video display according to claim 10, wherein
    the second member in the plate member has a smaller length in a vertical direction (lengthwise) or narrower in a horizontal direction (crosswise) than the first member, while being stopped after being rotated at an angle of less than 90 degrees by contacting a portion which is not smaller in length or made narrow in the second member with its frame even if the plate member is undesirably rotated on the body of the projection lens.

15. The projection type video display according to claim 11, wherein the second member in the plate member has a smaller length in a vertical direction (lengthwise) or narrower in a horizontal direction (crosswise) than the first member, while being stopped after being rotated at an angle of less than 90 degrees by contacting a portion which is not smaller in length or made narrow in the second member with its frame even if the plate member is undesirably rotated on the body of the projection lens.

16. The projection type video display according to claim 12, wherein the second member in the plate member has a smaller length in a vertical direction (lengthwise) or narrower in a horizontal direction (crosswise) than the first member, while being stopped after being rotated at an angle of less than 90 degrees by contacting a portion which is not smaller in length or made narrow in the second member with its frame even if the plate member is undesirably rotated on the body of the projection lens.

* * * * *